E. MOORE.
Seed-Planter.
No. 16,212. Patented Dec 9 1856.
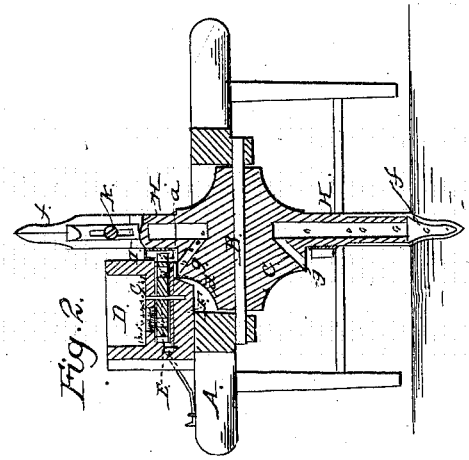
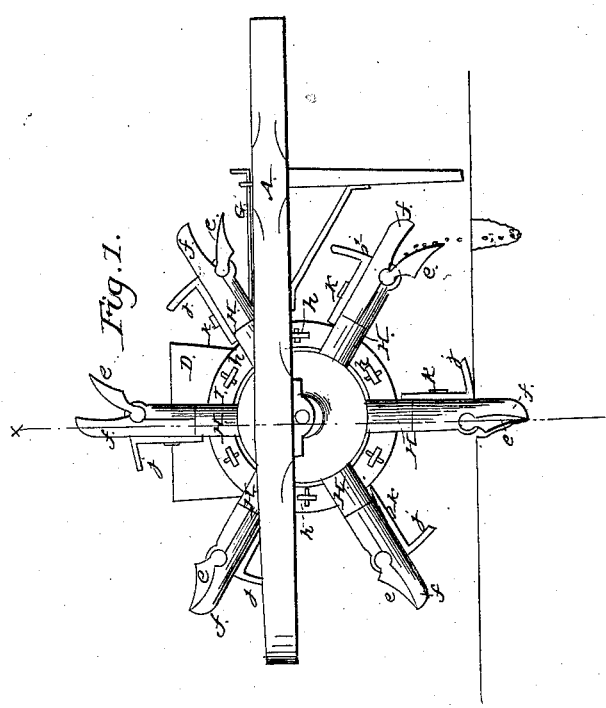
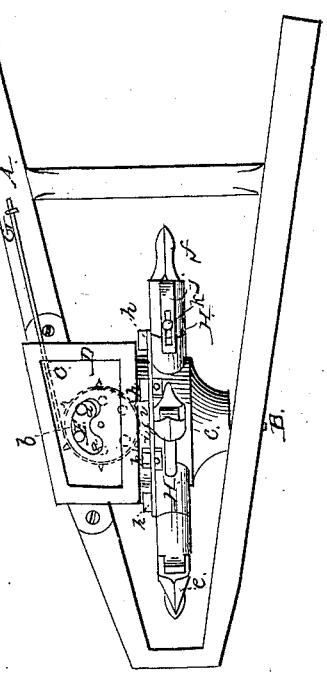

UNITED STATES PATENT OFFICE.

EDWIN MOORE, OF AVON, NEW YORK.

IMPROVEMENT IN SEED-PLANTERS.

Specification forming part of Letters Patent No. 16,212, dated December 9, 1856.

*To all whom it may concern:*

Be it known that I, EDWIN MOORE, of Avon, in the county of Livingston and State of New York, have invented a new and Improved Machine for Planting Corn and other Seeds; and I do hereby declare that the following is a full, clear, and exact description of the same, reference being had to the annexed drawings, making a part of this specification, in which—

Figure 1 is a side view of my improvement. Fig. 2 is transverse vertical section of the same, $x\,x$, Fig. 1, showing the plane of section. Fig. 3 is a plan or top view of the same.

Similar letters of reference indicate corresponding parts in the several figures.

My invention consists in having a series of hollow radial arms attached to a hub the axis of which is fitted in the frame of the machine. The interior passages or boxes of the arms communicate with passages in the hub, which passages rotate underneath a hopper provided with a horizontal distributing-wheel rotated by cogs on the hub. The ends of the arms are provided with flaps, which remain closed to prevent the seed from dropping out of the arms, and are opened at the proper time to allow the seed to fall into the holes prepared for it by the ends of the arms, which penetrate the earth, and thereby not only form the holes, but also cause the arms and hub to be rotated as the implement is drawn along.

To enable those skilled in the art to fully understand and construct my invention, I will proceed to describe it.

A represents the frame of the implement, which is of V form, and has a shaft, B, placed transversely in it.

On the shaft B a hub, C, is placed, and over one side of the hub C a hopper, D, is placed, said hopper being attached to one side of the frame A.

Underneath the bottom of the hopper a circular disk, E, is placed. This disk has holes $a$ made through it near its edge, and a hole, $b$, is made through the bottom $c$ of the hopper to allow the seed to pass into the holes $a$.

Underneath the disk E a circular plate, F, is placed, said plate having a hole, $d$, made through it, which hole registers with the holes $a$ as the disk E rotates. The plate F has a rod, G, attached to it for the purpose of allowing the plate to be turned when necessary and serve as a cut-off, as will be presently explained.

To the hub C a series of radial arms, H, are attached. These arms are hollow, and their ends are provided with flaps $e$ and beaks or sharp-edged shares or plates $f$, the inner sides of which are grooved longitudinally, and over which the flaps $e$ close at certain periods of the revolutions of the hub C. The interior passages of the arms H communicate with passages $g$, which are made from the inner ends of the arms to the periphery of the hub, the outer ends of the passages $g$, as the hub C rotates, passing underneath and registering with the holes $a$ in the disk E and the hole $d$ in the plate F.

I represents an annular plate, which is placed on the hub C, and having cogs $h$ fitted to one side. These cogs are so attached to the plate that they may be readily moved or detached when necessary. The disk E also has cogs $i$ on its periphery, against which cogs the cogs $h$ on the plate I act as the hub C rotates.

The arms H have adjustable gages $j$ attached to them. These gages are formed of metal bars bent in right angular form, one part projecting outward from the arms and the other part placed against the arms and attached to the arms by set-screws $k$.

The operation is as follows: The corn or other seed to be planted is placed in the hopper D, and the implement is drawn along by a horse, or it may be shoved along by the operator, the ends of the side pieces of the frame serving as handles. As the machine is moved along the beaks or shares $f$ enter the ground and cause the hub C to rotate. As the hub C rotates the orifices of the passages $g$ pass underneath the holes $a$ in the disk E, which is rotated by the cogs $h$ on the plate I acting against the cogs $i$ on the disk E, and the seed passes from the holes $a$ through the hole $d$ in the plate F and into the hollow arms H. The flaps $e$ remain closed by their own gravity till the beaks or shares $f$ leave the ground, and the flaps then open and the seed drops into the hole made by the beaks or shares. This is shown clearly in Fig. 1. The guards $j$ cause the shares $f$ to penetrate the ground at an equal distance, so that the seed will be planted at the same depth. By removing every alternate cog $h$ the seed will only pass into every alternate arm H, as the disk E will only be turned as the alternate passages $g$ pass underneath the holes $a$ in said disk. Hence the reason for having the cogs $h$ so attached to the plate I that they may be removed from it and allow the seed to be planted at varying distances apart. By moving the rod G the plate $f$ is turned and the hole $d$ in said plate turned out of register or line with the holes $a$ in the disk E and the orifices of the passages $g$ in the hub C. The plate F therefore serves as a cut-off, and prevents the dropping of the seed as the implement is drawn or moved from place to place.

The above implement is extremely simple in construction, and will plant the seed in rows both ways without having the ground furrowed or marked off. It may also be used for planting various seeds, and may be constructed at a reasonable cost.

I do not claim the hollow arms H, through which the seed passes from the hopper, for hollow-armed wheels have been previously used for that purpose; neither do I claim operating the distributing device by means of radial rotating arms or rods penetrating the ground, for they have been previously used as a specific device for that purpose; but,

Having thus described my invention, what I claim as new, and desire to secure by Letters Patent, is—

The hollow arms H, provided with flaps $e$ and beaks or shares $f$ at their ends, the arms being attached to a hub, C, provided with passages $g$ and cogs $h$, and the perforated disk E and cut-off plate F underneath the hopper D, the whole being arranged as shown and described, for the purpose set forth.

EDWIN MOORE.

Witnesses:
JOHN MORTON,
WM. PENGRA.